Patented Nov. 17, 1925.

1,561,740

UNITED STATES PATENT OFFICE.

IZADOR J. NOVAK, OF BRIDGEPORT, CONNECTICUT, ASSIGNOR TO THE RAYBESTOS COMPANY, OF BRIDGEPORT, CONNECTICUT, A CORPORATION OF CONNECTICUT.

PROCESS FOR MAKING BRAKE SEGMENTS.

No Drawing.   Application filed October 21, 1922.   Serial No. 596,153.

*To all whom it may concern:*

Be it known that I, IZADOR J. NOVAK, a citizen of the United States, and a resident of the city of Bridgeport, county of Fairfield, and State of Connecticut, have invented certain new and useful Improvements in Processes for Making Brake Segments, of which the following is a specification.

This invention relates to Improvements in making curved brake segments, and relates more particularly to brake elements used in connection with the braking of heavy machinery.

Among the objects of the invention are to provide a method whereby the different sizes and shapes of curved brake segments may be made by means of a single operation, thereby dispensing with the necessity of having separate curved molds for all sizes of the segments.

The use of curved brake segments of molded friction material for brakes, and similar devices where frictional resistance is applied to a rotating curved surface has come into prominence due to the fact that they exhibit exceptionally low wear because of their high density, and consequently require very little care or adjustment.

It is almost universal practice among the higher class of foreign automobiles, and also in connection with heavy stationary machinery to use brakes lined with molded curved segments of frictional material. In fact the molded segments have almost entirely superseded the flexible woven type of brake lining in connection with heavy machinery in manufacturing, transportation machinery, and in innumerable other uses. In these lines a great quantity of molded friction resistance substances is used.

This material has heretofore been made by the use of heat and pressure in a mold which was substantially machined to produce the correct curvature and thickness. This necessitates the manufacture of a distinct and individual mold for each different width, thickness and curvature desired, and to produce the different sizes of mold segments at present used industrially, a very expensive stock of molds is necessary. These molds are very expensive, and as a consequence, a considerable amount of capital is invested in the molds themselves.

By the method hereinafter explained, it has been found practical to dispense with all curved molds by proper selection and manipulation of the binder material. In order to utilize this method, it is essential that the binder material be highly thermo plastic, and that it is of such composition that it will set by the action of heat to a material having very low thermo plastic qualities. Certain of the phenol resin condensation products have this property after their initial setting. There are also various combinations of phenol resins, varnish gums and like substances which have these desirable properties. The details of this method follow.

In the first place, there is made up by any convenient means a composition of asbestos or other fibre, and a sufficient proportion of the thermo plastic material previously mentioned to act as a binder. This may be woven asbestos tape saturated with a solution of the thermo plastic substance and the solvent removed by drying, or a homogeneous mixture of loose asbestos fibre and liquid binder material, the binder material in each case taking the form of the thermo plastic substances mentioned.

The composition is then set in suitable long flat molds under heavy hydraulic pressure at about 350° F., for a time sufficient to compact it as closely as desired, and flow the binder material uniformly through the fibre. This operation is a relatively short one and presses the material into dense flat strips of any desired length, width and thickness. It will be readily appreciated that the cost of molds for flat oblong pieces is much lower than the cost of the molds producing a curved contour.

Also, a single mold may produce segments for a brake drum of any diameter. The strips are now cut to the required developed length for the curved segment desired. They are heated on a steam table or other device until, due to the thermo plastic nature of the binder they may be bent through a limited arc without distortion or parting of the fibres. The exact temperature is naturally variable for the different binders, and the amounts of the binder in the various stocks will likewise be factors which will control to some extent the temperature necessary to make the segments malleable.

When the flat strip is sufficiently plastic, it is run through a set of forming rolls adjustable to be set at variable distances from one another, such as used for bending metal in an arc. These forming rolls are first set to give the curvature desired. When the piece has been bent or curved it is placed in an oven at an elevated temperature and baked until it is no longer thermo plastic. This operation may take from five to ten hours at temperatures in excess of 300° F. in order to get the curved segments into desired condition.

A further advantage of this method is the fact that wide, flat slabs of this material in any thickness may be kept in stock indefinitely, and on order any size may be sawed off, and shaped in a short period of time, thus eliminating the necessity of having on hand innumerable shapes for the different types of brake segments.

As an example of a thermo plastic composition for use as binder, I have taken equal parts of phenol resin and sandarac (a gum) and dissolved these together in alcohol and used as a saturant for woven asbestos tape such as made from asbestos covered wire. Preferably the tape is saturated while the binder is in heated condition and then after saturation the tape is dried to remove the alcohol, there being then left substantially one part of binder by weight to five parts of tape by weight. After drying, the tape is placed in a flat mold and compressed to the desired thickness. This mold is heated to 350° F., and the mass compressed for say ten minutes. This is sufficient to flow and set the binder partially without causing it to lose any of its thermo plastic properties.

It is then removed from the mold, cut into lengths, softened and heated to about 400° F., and while so heated, run slowly through forming rolls. It is then placed in an oven and baked for ten hours at about 300° F., when it then sets in the shape in which it was bent or formed.

I claim as my invention:

1. A process of making curved friction elements consisting in saturating a blank with a fusible binder capable of having thermo plastic properties under given conditions, subjecting the saturated blank to an initial treatment by hot presses, then while the binder still possesses thermo plastic properties, forming the blank to desired curvature and then curing the same to make the binder infusible.

2. A process of making curved friction elements consisting in making a composition of fibrous material and a fusible binder capable of having thermo-plastic properties under given conditions, subjecting the composition to an initial treatment under heat and pressure, then while the binder still possesses thermo-plastic properties, forming the composition to desired curvature and then curing to make the binder infusible.

3. A process of making curved friction elements consisting in making a composition of an incombustible fibrous material and a fusible binder capable of having thermo-plastic properties under given conditions, subjecting the composition to an initial treatment under heat and pressure, then while the binder still possesses thermo-plastic properties, forming the composition to desired curvature and then curing the same to make the binder infusible.

4. A process for making curved friction elements consisting in producing flat slabs containing a binder thermo-plastic under given conditions, forming the slabs to a predetermined curvature by rolling, and then rendering said binder nonthermo plastic.

5. A process of making curved friction elements consisting in making a composition of fibrous material and a fusible binder capable of having thermo-plastic properties under given conditions, subjecting the composition to an initial treatment under heat and pressure, then while the binder still possesses thermo-plastic properties, forming the blank to desired curvature, and then curing.

6. A process of making curved friction elements consisting in saturating fibrous material with a fusible binder having thermo-plastic properties, subjecting the saturated fibrous composition to an initial heat and pressure treatment to cause the binder to flow and set partially without losing any substantial portion of its thermo-plastic properties, in then forming the fibrous composition to desired curvatures and in then curing the curved product to make the binder nonthermo-plastic.

7. A process for making curved friction elements consisting in producing flat slabs containing a binder thermo-plastic under given conditions, forming the slabs to a predetermined curvature by rolling and then rendering said binder non-thermo plastic, without substantial distortion or parting of the fibres.

IZADOR J. NOVAK.